Patented Jan. 8, 1952

2,581,907

UNITED STATES PATENT OFFICE 2,581,907

RUBBERY DIOLEFINIC POLYMERS CONTAINING AS ANTIOXIDANT A MIXTURE OF ANTIMONY OXIDE AND A 2,4,6 TRIHYDROCARBON SUBSTITUTED PHENOL

George E. P. Smith, Jr., and Harry E. Albert, Akron, Ohio, assignors to The Firestone Tire & Rubber Company, Akron, Ohio, a corporation of Ohio No Drawing. Application March 9, 1946, Serial No. 653,427

12 Claims. (Cl. 260—45.75)

This invention relates to antioxidants for rubber-like copolymers of a conjugated diene and a vinyl aromatic monomer. The antioxidants are effective with both the uncured and the cured copolymers. The invention includes compositions which contain the antioxidant material and methods of using the antioxidant.

The antioxidants of this invention are 2,4,6-trisubstituted phenols of the type

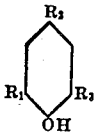

in which $R_1$, $R_2$, and $R_3$ are nonaryl hydrocarbon substituents, $R_2$ having 1 to about 10 carbon atoms, and the sum of the number of carbon atoms in $R_1$ and $R_3$ being from 2 to about 20. Improved antioxidant properties are obtained by using antimony oxide with the trisubstituted phenol.

Examples of the substituents which may be present in the 2, 4 or 6-positions are methyl, ethyl, n-propyl, isopropyl, n-butyl, isobutyl, sec-butyl, tert-butyl, cyclobutyl, cyclopentyl, neopentyl, tert-amyl, n-amyl, n-hexyl, isohexyl, sec-hexyl, tert-hexyl, cyclohexyl, cyclopentyl-methyl, 2 - methyl - cyclopentyl, 1,1-dimethyl-$\Delta^3$-butenyl, $\Delta^2$-cyclohexenyl, n-heptyl, 2-heptyl, tert-heptyl, n-octyl, 2-octyl, 3-octyl, 2-ethylhexyl, tert-octyl, 1,1,3,3-tetramethylbutyl, tert-nonyl, tert-decyl, n-decyl, benzyl, 3,3,5-trimethylcyclohexyl, 2-methylcyclohexyl, 4-methylcyclohexyl, alpha-cyclohexylethyl, alpha-(4-methylcyclohexyl) ethyl, isobornyl, menthyl, etc.

The substituent in the 2- (or 6-) position may be any of the above. In addition, it may contain up through about 19 carbon atoms, provided that the substituent in the other position ortho to the phenolic hydroxyl group is sufficiently small. Examples of these large ortho groups are 4-cyclohexylcyclohexyl; 4 - alpha,alpha,gamma,gamma-tetramethylbutylcyclohexyl; tert-dodecyl; the tert-hexadecyl groups introduced by alkylation with the tetramers of isobutylene; n-octadecyl; alpha - (4 - ethylcyclohexyl)-alpha-methylethyl; 1-ethyl-4-isopropylcyclohexyl; etc.

Although the 3- and/or 5-positions may be substituted, as, for example, with similar substituents, we prefer to use the trisubstituted phenols which are unsubstituted in the 3- and 5-positions. In general, 2,3,4,6-tetra- and 2,3,4,5,6-penta-alkyl, etc., phenols are difficult to prepare since substituents present in the 3- and 5-positions provide steric hindrance to the introduction of the necessary ortho and para substituents.

The stabilizers of this invention include:

2,4-dimethyl-6-tert-butylphenol
2,4-dimethyl-6-(alpha,alpha,gamma,gamma-tetramethylbutyl) phenol
2,6-di-tert-butyl-4-methylphenol
2-methyl-4,6-di-tert-butylphenol
2,6-di-(alpha,alpha,gamma,gamma-tetramethylbutyl)-4-methylphenol
2,6-di-tert-butyl-4-sec-butylphenol
2,4,6-tri-tert-butylphenol
2,4,6-trimethylphenol (mesitol)
2,4,6-triethylphenol
2,4,6-tri-n-propylphenol
2,4,6-tri-isopropylphenol
3,5-dimethyl-2,4,6-triethylphenol
2,4,-dimethyl-6-cyclohexylphenol
2,4-dimethyl-6-octadecylphenol
2,6-di-tert-octyl-4-propylphenol
2,6-di-tert-butyl-4-ethylphenol
2-propyl-4-methyl-6-tert-octylphenol
2-propyl-4-cyclohexyl-6-tert-butylphenol
2,4-dicyclohexyl-6-methylphenol
2,4-dimethyl-6-benzylphenol
2,6-dibenzyl-4-methylphenol
2,4-dicyclohexyl-6-tert-butylphenol
2-isopropyl-4-methyl-6-tert-butylphenol
2-methyl-4-(p-methylcyclohexyl)-6-tert - amylphenol
2-n-butyl-4-ethyl-6-tert-octylphenol
2-isobutyl-4-ethyl-6-tert-hexylphenol
2,3,4,5,6-pentamethylphenol
2 - propyl - 4 - ethyl - 6 - (alpha-(p-methylcyclohexyl)-alpha-methylethyl) phenol
2-tert-butyl-4-methyl-6-bornylphenol
2-isopropyl-4-ethyl-6-fenchylphenol
2,4-dimethyl-6-hexenylphenol
2,4-dimethyl-6-tert-amylphenol
2,4-dimethyl-6-heptylphenol
2,3,4-trimethyl-6-tert-butylphenol
2,4-di-tert-amyl-6-methylphenol
2,6-di-tert-butyl-4-isopropylphenol
2,6-di-tert-amyl-4-methylphenol
2,6-di-tert-amyl-4-isopropylphenol 2,4-di-isopropyl-6-tert-butylphenol
2,4-di-isopropyl-6-sec-hexylphenol The preferred compounds of this invention contain a methyl group in the para position, or methyl group in the para position together with at least one methyl group in an ortho position. Preferred individual compounds are:

2,4-dimethyl-6-tert-octylphenol
2,6-di-tert-butyl-p-cresol

The following examples illustrate the preparation of the antioxidants:

EXAMPLE 1

*2,6-di-tert-butyl-4-secondary-butylphenol*

This stabilizer is prepared by treating p-sec-butylphenol, containing concentrated sulfuric acid catalyst and kept at a temperature of 70–75° C. with a stream of isobutylene gas for 8½ hours. The reaction mixture was washed to remove catalyst and fractionally distilled, the fraction boiling at 141–141.5° C./10 millimeters being taken as 2,6-di-tert-butyl-4-sec-butylphenol.

EXAMPLE 2

*2,4,6-tri-tert-butylphenol*

Isobutylene was passed into 100 grams of phenol dissolved in 200 grams of toluene and containing 5 grams of concentrated sulfuric acid catalyst until no more isobutylene was absorbed (2¼ hours); temperature was kept below 82° C. by a water bath. The mixture was washed to remove catalyst; and components boiling below 129° C./10 millimeters were distilled, leaving 197 grams of light yellow solid (crude yield 71 per cent); recrystallization from alcohol yielded pure 2,4,6-tri-tert-butylphenol, a white crystalline solid.

EXAMPLE 3

*2-methyl-4,6-di-tert-butylphenol*

A stream of isobutylene was passed for 4 hours into a mixture of 102 grams of o-cresol, 200 grams of toluene diluent, and 5 grams of concentrated sulfuric acid catalyst; the temperature rose to a maximum of 62° C. After washing to remove catalyst, the mixture was distilled; the fraction boiling at 132–134° C./10 millimeters was a light yellow oil which solidified. Yield=29 grams.

EXAMPLE 4

*2,6-di-tert-octyl-4-methylphenol*

During 310 minutes 896 grams of diisobutylene were added to 214 grams of p-cresol which was stirred vigorously. The mixture was kept at 10–20° C. by an ice bath, enough of the diisobutylene being added initially before cooling to prevent crystallization of the p-cresol. During the first 90 minutes of stirring at 10–20° C., 21 grams of catalyst (45 per cent solution of $BF_3$ in ether) were added in small (1-gram) portions. The reaction mixture was left standing over night (15 hours) at 40–45° C.; it then was washed by thorough agitation with 350 grams of 30 per cent sodium hydroxide solution. The oil layer was fractionally distilled through a 1-foot column packed with Raschig rings. Eighty-one grams (a 12 per cent yield) of 2,6-di(alpha,alpha,-gamma,gamma-tetramethylbutyl)-4-methylphenol were collected as a light yellow, highly viscous liquid boiling in the range 168–195° C./5 millimeters. On standing, crystallization took place. Two recrystallizations from methanol gave colorless prismatic crystals of M. P. 51.6–52.2° C.

EXAMPLE 5

*2,4-dimethyl-6-tert-octylphenol*

Fifty grams of 2,4-dimethylphenol containing 5 grams of catalyst (45 per cent boron trifluoride in ether) were stirred while adding 200 grams of diisobutylene by means of a dropping funnel during a period of 15 minutes. The temperature rose to 60° C.; and stirring was continued at 50–60° C. (hot plate) for an hour after the addition of diisobutylene was completed. The reaction mixture was washed with water and then dilute sodium hydroxide solution, dried over anhydrous potassium carbonate, and distilled through a 1-foot column packed with Raschig rings. A 68-gram yield (71 per cent) of 2,4-dimethyl-6-(alpha,alpha,gamma,gamma-tetramethylbutyl)phenol was obtained. It was a water-white, slightly viscous liquid with practically no odor and having a boiling point of 144–145.5° C./10 millimeters.

EXAMPLE 6

*2,6-di-tert-butyl-p-cresol*

The antioxidant used in tests recorded below was a colorless crystalline solid prepared by distilling and recrystallizing a crude isobutylene-alkylation product of p-cresol.

The 2,4-dimethyl-6-tert-butylphenol used in tests recorded below is a commercial product.

While the stabilizers of this invention may be added to the copolymer composition to be preserved in any conventional manner, such as by milling or Banbury mixing, they are preferably added directly to the latex which results from the emulsion copolymerization. Thus, the stabilizer is incorporated before coagulation and drying of the copolymer have been effected.

The stabilizer is conveniently added to the latex in emulsion form. For example, it may be emulsified in 5 per cent sodium oleate solution or by using various aromatic sodium sulfonates, etc.

After coagulation of the latex, the commercial drying of the copolymer is carried out at an elevated temperature; e. g., 240° F. for a period of 50 to 60 minutes. These conditions are sufficiently drastic to cause deterioration of unstabilized copolymer. Consequently, to produce the best light-colored copolymer, the stabilizer should be present during the drying operation.

Unstabilized copolymer deteriorates on standing. The copolymer to which stabilizer is added in latex form is capable of storage, even at higher temperatures, without substantial deterioration.

On the laboratory scale, wet copolymer samples were dried 20 hours at 75° C., this drying being less conducive to discoloration and other effects of aging than the higher temperature methods used commercially. However, the antioxidants of this invention stabilize at the higher drying temperatures without substantial discoloration. The following table records the results of adding 2 per cent of various antioxidants to a latex of butadiene-styrene copolymer, more generally known as GR–S, before coagulation, and then drying and heat-aging the coagulum. The table not only records any discoloration noted on drying but also indicates any change in the physical properties of the copolymer on drying or heat-aging.

TABLE I.—STABILIZATION OF UNCURED COPOLYMER

| Antioxidant | After Drying 20 Hours at 75° C. | Heat-aged at 90° C.— | | |
|---|---|---|---|---|
| | | One Day | Two Days | Three Days |
| 2,4-dimethyl-6-tert-butylphenol | tan, condition satisfactory | somewhat set up | set up | cured. |
| 2,6-di-tert-butyl-p-cresol | cream color, condition satisfactory. | do | somewhat set up | somewhat set up. |
| 4,6-di-tert-butyl-m-cresol | do | set up, surface slightly sticky. | cured | slightly hardened. |
| blank | slightly hardened | hardened | | |

All the samples tested in Table I were coagulated from the latex composition containing the antioxidant by means of crude aluminum sulfate. The examples show that the blank containing no stabilizer quickly hardened. The hardening was stopped or materially retarded by the various antioxidants. The 2,4,6-trisubstituted phenols were both more effective than the 3,4,6-trisubstituted phenol.

It was found that the addition of antimony oxide with the stabilizer gave still further improved stabilization. The following table relates to tests made on the uncured copolymer. The various stabilizers were added to the latex, and the latex was then coagulated with low-iron aluminum sulfate.

TABLE II.—STABILIZATION OF UNCURED COPOLYMER

| Antioxidant | After Drying 20 Hours at 75° C. | After Aging One Day at 110° C. |
|---|---|---|
| 2% 2,6-di-tert-butyl-p-cresol | light gray-brown, condition satisfactory. | brownish-yellow, slightly set up. |
| 2% 2,6-di-tert-butyl-p-cresol +1% antimony oxide. | cream color, condition satisfactory. | light yellow, otherwise unchanged. |
| 2% Stalite (control) | bluish-gray, condition satisfactory. | brown, very slightly set up. |

The Stalite used as a control is a heptylated diphenylamine. It is recognized as one of the more satisfactory antioxidants for GR-S. The trialkylphenol preserves the original condition of the copolymer about as well as Stalite. The addition of antimony oxide improves the stabilization and helps to maintain the light color. The trialkylphenol alone does not discolor to the extent that Stalite does.

In the following table the effect of a different trialkylphenol is shown and compared with phenyl-beta-naphthylamine, which is a widely used antioxidant in GR-S. Included in the table are the results of a test with a dialkylphenol which has the same number of carbon atoms as the trialkylphenol. The trialkylphenol is the better antioxidant because it has alkyl groups in the 2, 4, and 6 positions instead of just in the 2 and 4 positions. The various antioxidants were added to the latex which was then coagulated with low-iron aluminum sulfate.

TABLE III.—STABILIZATION OF UNCURED COPOLYMER

| Antioxidant | After Drying 20 Hours at 75° C. | Heat-aging at 110° C.— | |
|---|---|---|---|
| | | One Day | Two Days |
| 2% 2,4-dimethyl-6-tert-octylphenol | very light brown, condition satisfactory. | yellow-tan, otherwise unchanged. | yellow-tan, otherwise unchanged. |
| 2% 2,4-diamylphenol | dark cream, condition satisfactory. | light tan, otherwise unchanged | yellow-tan, somewhat set up, brown, otherwise unchanged. |
| 2% phenyl-beta-naphthylamine (control). | brown, condition satisfactory | brown, otherwise unchanged | brown, otherwise unchanged. |

The table shows that the trialkylphenol is equivalent to the control in antioxidant properties and does not discolor to the extent that the control does.

Tests were made on the vulcanized copolymer. The various antioxidants were added to the latex before coagulation. The resulting coagulum was then compounded, being heavily loaded with white pigment to illustrate that the antioxidants of this invention are nondiscoloring. The tests were conducted on stock compounded according to the following formula:

*Formula*

Copolymer+2% antioxidant _____ 100
Cumar MH 2½ _____ 10
Trimene base_____ 1.1
Wax_____ 2
Magnesium oxide_____ 8
Zinc oxide_____ 100
Ultramarine blue_____ 0.1
Titanium dioxide_____ 30
Sulfur_____ 4

"Trimene base" is triethyl trimethylenetriamine, a commercial accelerator. "Cumar MH 2½ refers to a commercial coumarone-indene resin of medium hardness. Various portions of the compounded materials were cured 30, 50, and 70 minutes, respectively, at 290° F. The following table of physical properties records the average of tests made on samples subjected to the different cures.

TABLE IV.—PHYSICAL PROPERTIES OF VULCANIZATE

| Antioxidant | 200% Modulus | | Tensile | | | Elongation | | |
|---|---|---|---|---|---|---|---|---|
| | Normal | Aged | Normal | Aged | Per Cent of Normal | Normal | Aged | Per Cent of Normal |
| 2% 2,6-di-tert-butyl-p-cresol | 310 | 700 | 1,375 | 1,425 | 103.5 | 535 | 405 | 75.8 |
| 2% 2,6-di-tert-butyl-p-cresol +1% antimony oxide | 260 | 650 | 1,425 | 1,480 | 104.0 | 530 | 420 | 79.2 |
| 2% Stalite | 290 | 610 | 1,200 | 1,290 | 107.5 | 495 | 400 | 81.6 |

The aged material had been heated four days in an oven at 212° F. The table shows that the vulcanizate stabilized with the stabilizer of this invention compares favorably with the control.

Vulcanizate containing the stabilizer of this invention was subjected to exposure tests to determine its discoloring properties. The stock was compounded according to the above formula and cured 50 minutes at 290° F. The following tables record the results of subjecting test samples to artificial exposure and natural exposure, respectively. The artificial-exposure tests were made under a Fadeometer at 125° F. and under a sunlamp at 7 inches. The natural-exposure tests were conducted using tapered dumbbell strips stretched 12½ per cent on racks. These were exposed first to two months of weathering in Florida, beginning in February, and then to two months of weathering in Akron, beginning in May.

TABLE V.—ARTIFICIAL EXPOSURE TESTS ON VULCANIZATE

| Antioxidant | Fadeometer | | Sunlamp | |
|---|---|---|---|---|
| | 5 Hours | 10 Hours | 8 Hours | 16 Hours |
| 2% 2,6-di-tert-butyl-p-cresol | white | white | white | light cream. |
| 2% 2,6-di-tert-butyl-p-cresol+1% antimony oxide | do | do | do | white. |
| 2% Stalite (control) | cream | light brown | tan | light brown. |

TABLE VI.—NATURAL EXPOSURE TESTS ON VULCANIZATE

| Antioxidant | After Florida Exposure | | After Florida and Akron Exposures | |
|---|---|---|---|---|
| | Color | Checking | Color | Checking |
| 2% 2,6-di-tert-butyl-p-cresol | white | none | slightly discolored | severe. |
| 2% 2,6-di-tert-butyl-p-cresol+1% antimony oxide | do | do | white | moderate. |
| 2% Stalite (control) | light cream | very slight | tan | very severe. |

The tables show that the antioxidant of this invention does not discolor under conditions which produced considerable discoloration using Stalite. Furthermore, the natural-exposure tests are of interest because they show that the stabilizer of this invention gives protection against weather-checking. This is a most important advantage of this stabilizer over Stalite and other commercial and known antioxidants.

The invention is not limited to the details disclosed. In general, the amount of antioxidant or mixture of antioxidants employed will vary from about 0.1 to 10 percent. Although described more particularly in connection with the stabilization of the butadiene-styrene copolymer known as GR–S, the invention includes generally the stabilization of copolymers of a conjugated diene—such as, for example, butadiene, isoprene, 2-cyanobutadiene, pentadiene, piperylene, dimethylbutadiene, etc.—and a vinyl aromatic monomer—such as, for example, styrene, alpha-methylstyrene, nuclear-substituted styrenes, monochlorostyrene, dichlorostyrene, vinylnaphthalene, vinylbiphenyl, vinylcarbazole, 2-vinyl-5-ethylpyridine, 2 - ethyl - 5 - vinylpyridine, etc. Modifications may be made in the disclosure without departing from the scope of the appended claims.

What we claim is:

1. A rubber-like copolymer of a conjugated diene and a vinyl aromatic monomer which contains as antioxidant a mixture of antimony oxide and a 2,4,6-trisubstituted phenol in which the substituents are nonaryl hydrocarbon substituents, the substituent in the para position contains 1 to 10 carbon atoms, and the sum of the carbon atoms in the ortho positions is 2 to 20.

2. A rubber-like copolymer of butadiene and styrene which contains as antioxidant a mixture of antimony oxide and a 2,4,6-trialkylphenol in which the alkyl group in the para position contains 1 to 10 carbon atoms, and the sum of the carbon atoms in the ortho positions is 2 to 20.

3. Uncured, rubber-like copolymer of butadiene and styrene which contains as antioxidant a mixture of antimony oxide and a 2,4,6-trisubstituted phenol in which the substituents are nonaryl hydrocarbon substituents, the substituent in the para position contains 1 to 10 carbon atoms, and the sum of the carbon atoms in the ortho positions is 2 to 20.

4. Uncured, rubber-like, butadiene-styrene copolymer which contains as antioxidant a mixture of antimony oxide and a 2,6-disubstituted-4-methylphenol in which the substituents are nonaryl hydrocarbon substituents in which the sum of the carbon atoms in the ortho positions totals 2 to 20.

5. Uncured, rubber-like, butadiene-styrene copolymer which contains as antioxidant a mixture of antimony oxide and 2,6-di-tertiary-butyl-p-cresol.

6. Uncured, rubber-like butadiene-styrene copolymer which contains as antioxidant a mixture of antimony oxide and 2,4-dimethyl-6-tertiary-octylphenol.

7. Vulcanizate of a rubber-like copolymer of a conjugated diene and a vinyl aromatic monomer which contains as antioxidant a mixture of antimony oxide and a 2,4,6-trisubstituted phenol in which the three substituents are nonaryl hydrocarbon substituents, the substituent in the para position contains 1 to 10 carbon atoms, and the sum of the carbon atoms in the ortho substituents totals 2 to 20.

8. Vulcanizate of butadiene-styrene, rubber-like copolymer which contains as antioxidant a mixture of antimony oxide and a 2,4,6-trisubstituted phenol in which the substituents are nonaryl hydrocarbon substituents, the substituent in the para position contains 1 to 10 carbon atoms, and the sum of the carbon atoms in the substituents in the two ortho positions is 2 to 20.

9. Vulcanizate of butadiene-styrene, rubber-like copolymer which contains as antioxidant a mixture of antimony oxide and 2,6-di-tertiary-butyl-p-cresol.

10. Vulcanizate of butadiene-styrene, rubber-like copolymer which contains as antioxidant a mixture of antimony oxide and 2,4-dimethyl-6-tertiary-octylphenol.

11. The method of obtaining dried coagulum from a latex of a rubber-like copolymer of a conjugated diene and a vinyl aromatic monomer which comprises (1) adding to the latex antioxidant which is a mixture of antimony oxide and a 2,4,6-trisubstituted phenol in which the three substituents are nonaryl hydrocarbon substituents, the substituent in the para position contains 1 to 10 carbon atoms, and the sum of the number of carbon atoms in the ortho substituents is 2 to 20, (2) coagulating, and then (3) drying.

12. The method of vulcanizing uncured, rubber-like copolymer of a conjugated diene and a vinyl aromatic monomer which comprises compounding therewith vulcanizing ingredients and as antioxidant a mixture of antimony oxide and a 2,4,6-trisubstituted phenol in which the three substituents are nonaryl hydrocarbon substituents, the para substituent contains 1 to 10 carbon atoms, and the sum of the number of carbon atoms in the ortho substituents is 2 to 20, and thereafter vulcanizing.

GEORGE E. P. SMITH, Jr.
HARRY E. ALBERT.

REFERENCES CITED

The following references are of record in the file of this patent:

UNITED STATES PATENTS

| Number | Name | Date |
|---|---|---|
| 1,938,731 | Tschunkur et al. | Dec. 12, 1933 |
| 2,061,111 | Stevens et al. | Nov. 17, 1936 |
| 2,161,024 | Doolittle | June 6, 1939 |
| 2,175,082 | Hagen et al. | Oct. 3, 1939 |
| 2,202,877 | Stevens et al. | June 4, 1940 |
| 2,248,830 | Stillson | July 8, 1941 |
| 2,252,318 | Gravell et al. | Aug. 12, 1941 |
| 2,265,582 | Stevens et al. | Dec. 9, 1941 |
| 2,270,959 | Murke et al. | Jan. 27, 1942 |
| 2,298,660 | Stevens et al. | Oct. 13, 1942 |
| 2,310,449 | Lightbown et al. | Feb. 9, 1943 |
| 2,356,929 | Hart | Aug. 29, 1944 |
| 2,360,450 | Sibley | Oct. 17, 1944 |
| 2,471,887 | Nelson | May 31, 1949 |

OTHER REFERENCES

India Rubber World, August 1946, pages 680–681.